(12) United States Patent
Staggs (10) Patent No.: US 7,431,319 B2
(45) Date of Patent: Oct. 7, 2008

(54) HITCH LOCKING MECHANISM

(76) Inventor: Arnol Staggs, 1155 Lincoln, Wyandotte, MI (US) 48192

( * ) Notice: Subject to any disclaimer, the term of this patent is extended or adjusted under 35 U.S.C. 154(b) by 191 days.

(21) Appl. No.: 11/076,270

(22) Filed: Mar. 10, 2005

(65) Prior Publication Data
US 2006/0208457 A1 Sep. 21, 2006

(51) Int. Cl.
*B60D 1/60* (2006.01)
(52) U.S. Cl. ............... 280/507; 280/491.5; 280/511
(58) Field of Classification Search ........... 280/491.5, 280/455.1, 186, 507, 511; 340/431, 425.5, 340/686.4; 240/686.4
See application file for complete search history.

(56) References Cited

U.S. PATENT DOCUMENTS

| 2,685,468 A | * | 8/1954 | Blocker et al. ............. 403/350 |
| 3,677,564 A | * | 7/1972 | Kothmann ................. 280/457 |
| 4,593,264 A | * | 6/1986 | Engle ........................ 340/431 |
| 4,627,633 A | * | 12/1986 | Gehman et al. ............. 280/432 |
| 4,836,570 A | * | 6/1989 | Lopez et al. ................ 280/507 |
| 5,423,566 A | * | 6/1995 | Warrington et al. ...... 280/415.1 |
| 5,434,552 A | * | 7/1995 | Ems ........................... 340/431 |
| 5,476,279 A | * | 12/1995 | Klemetsen ............... 280/415.1 |
| 5,860,669 A | * | 1/1999 | Wass et al. .............. 280/416.1 |

* cited by examiner

*Primary Examiner*—Lesley D. Morris
*Assistant Examiner*—Maurice Williams
(74) *Attorney, Agent, or Firm*—Gerald R. Black

(57) ABSTRACT

The hitch assembly comprises a hitch member, a shank assembly for attachment to the towing vehicle, a tow vehicle mount for attachment to the towed vehicle, and a hitch alarm. The hitch member comprises a drop ball mount, and a drawbar. The drawbar is secured to the undersurface of the drop ball mount. The shank assembly includes a shank, a ball mount, a pair of ballasts, and a coupling member. The shank extends through the opening of the drop ball mount. The ball mount has a threaded engagement with one end of the shank. Interchangeable ball mounts and the use of one or two ballasts enable the same hitch assembly to be used to tow varying loads. The tow vehicle mount is secured to the undersurface of the towed vehicle. The tow vehicle mount comprises a receiver tube secured to a vehicle guide plate. The drawbar is inserted into and through the receiving tube. The hitch alarm detects an unauthorized removal of either the hitch member or the towed vehicle from the towing vehicle. The hitch alarm is substantially hidden from view when the drawbar is secured to the tow vehicle mount.

5 Claims, 10 Drawing Sheets

FIGURE 3B
Clamp

FIGURE 3A
Hitch

FIGURE 5A
Shank Assembly

FIGURE 5B
Shank Assembly

FIGURE 6A
Shank Assembly

FIGURE 6B
Shank Assembly

FIGURE 7B
Shank Assembly

FIGURE 7A
Shank Assembly

FIGURE 7C
Shank Assembly

FIGURE 8A Shank Assembly

FIGURE 8B Shank Assembly

FIGURE 8C Hitch

FIGURE 9A
plunger switch - armed condition

FIGURE 9B
plunger switch - alarm condition

FIGURE 10A
Trailer Hitch Coupler

FIGURE 10B
Trailer Hitch Coupler with Alarm

HITCH LOCKING MECHANISM

This patent application claims the benefit under 35 USC §112 to the filing date of co-pending U.S. patent application "Hitch Locking Mechanism" Ser. No. 10/387,233, filed on Mar. 13, 2004; U.S. patent application "Hitch Locking Mechanism" Ser. No. 10/372,507, filed on Feb. 24, 2003 (now abandoned); and U.S. Provisional Application "Hitch Locking Mechanism" 60/419,070 filed on Oct. 17, 2002.

FIELD OF USE

The present invention relates to hitch locking mechanisms, and more particularly, to a unique anti-theft mechanism that is adaptable to many different hitch locking applications.

BACKGROUND OF THE INVENTION

Trailers attached to pull vehicles are commonly used to transport machinery, livestock and other goods. When the trailer is unhitched from the pull vehicle, the trailer and its goods are subject to theft by undesired coupling to some other towing or pull vehicle.

Various locking mechanisms have been used for trailer hitches. One shortcoming of many of the conventional locking mechanisms is that they rely on an exposed padlock that can be cut quickly and easily by thieves using bolt cutters. One sharp blow with a hammer and chisel can also pop many padlocks open. All of such locking mechanisms are relatively easy to pry off of or out of the protected ball or socket component.

With the increase in towed leisure vehicles, many people go to the trouble and expense to have sturdy chains anchored in the ground and secure the chains to their towed vehicles by padlocks, only to discover that a thief can readily cut a padlock or chain of such an arrangement by using heavy-duty bolt-cutters, a hacksaw or other tool.

Various solutions have been proposed to indicate a secure trailer hitch connection and to alert the driver of the towing vehicle of a loose connection or of theft of the trailer.

U.S. Pat. No. 4,230,336 discloses an anti-theft ball for use with ball and socket hitches an externally threaded mounting bolt that engages an internally threaded central opening in the ball. A smaller diameter-locking bolt extends downwardly through a smaller diameter opening in the top of the ball and engages an internally threaded opening in the upper end of the mounting bolt. The threads on the mounting bolt have a different pitch than the threads on the locking bolt. The socket of the hitch prevents access to the locking bolt and the different pitches prevent the mounting bolt from being disengaged. Also, U.S. Pat. No. 5,087,064 discloses an anti-Theft and Safety Device for a Ball and Socket Trailer Hitch. The apparatus prevents the socket of such a hitch from being disconnected from the ball inadvertently or without the owners' permission. But nothing was provided to protect the ball.

Figure 1:
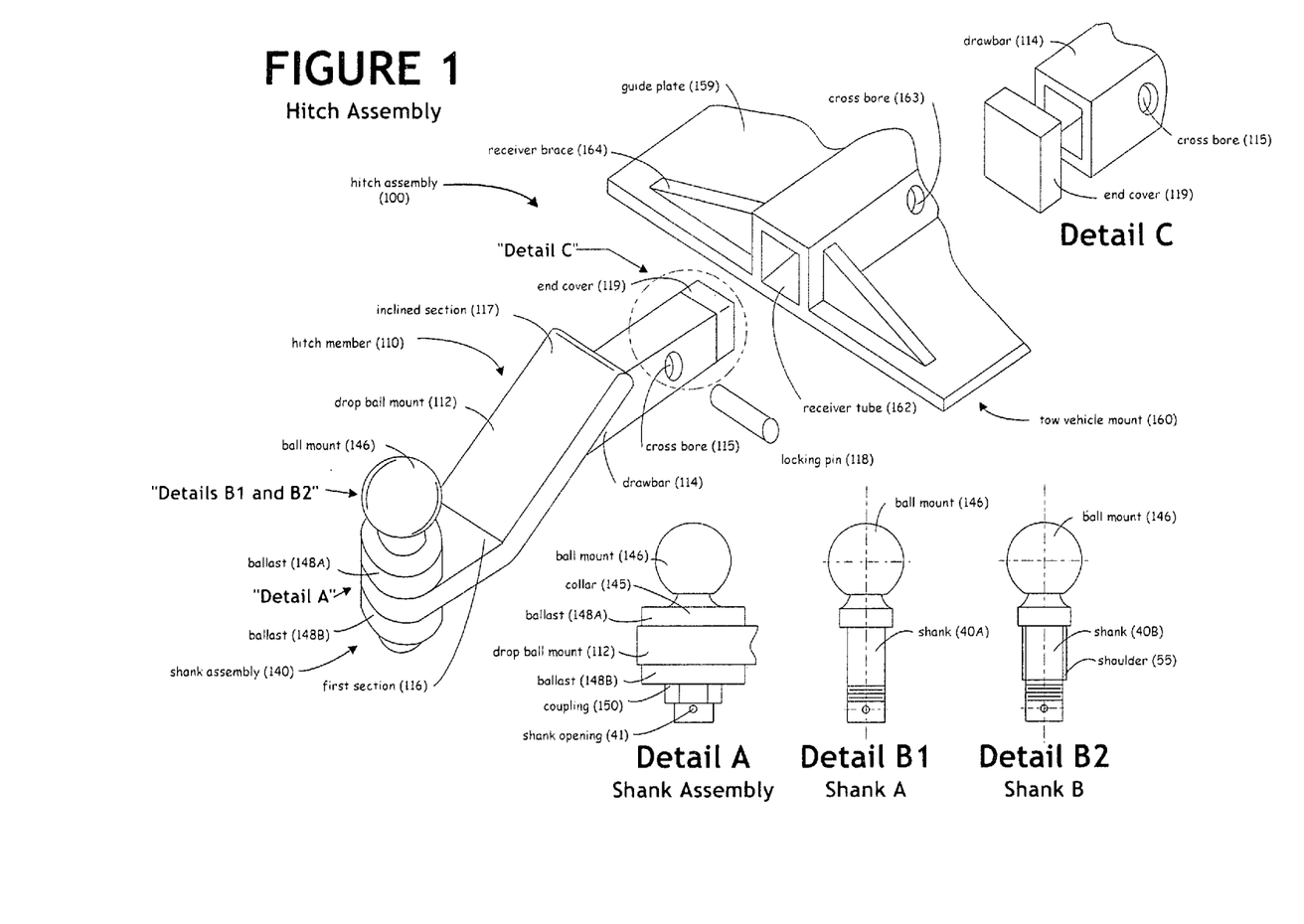
FIG. 1 discloses the preferred embodiment of the hitch locking mechanism of the present invention, the hitch locking mechanism comprising a shank assembly disposed within a drop-ball mount, the drop-ball mount being secured to a backing plate, a drawbar extending from the backside of the drop ball mount, the drawbar cooperatively engaging into a receiver tube, the receiver tube being secured to a vehicle cross member.

A conventional Pintle clamp is depicted in FIG. 1. The clamp includes a jaw pivotally attached to a base. A latch holds the jaw in place once the hitch is engaged. The latch has been known to yield under heavy loads and rough road conditions. In addition, the shaft often includes several ball mounts to accommodate varying load conditions. Also, the Pintle clamps also rated for various loads, and more than one clamp is generally needed.

However, these hitches will usually only accommodate trailers of certain sizes and not others. Accordingly, there is a need for an improved type of inexpensive and effective trailer hitch that is easy to assemble and install, that can safely accommodate different size vehicles and loads, that is compatible with various hitch designs, and that provides improved wear. What is needed is a trailer hitch assembly that is tamper-resistant to discourage theft of the towed vehicle or the hitch, and upon the unauthorized removal of the hitch from the towing vehicle, and sounds a blatant alarm which either can or cannot be deactivated (design choice) by recoupling the hitch to the towing vehicle.

SUMMARY OF THE INVENTION

The preferred embodiment of the hitch assembly of the present invention comprises a hitch member, a shank assembly for attachment to the towing vehicle, a tow vehicle mount for attachment to the towed vehicle, and a hitch alarm.

The hitch member comprises a drop ball mount, and a drawbar. The drop ball mount includes an opening extending therethrough for the shank assembly. The drawbar is secured to the undersurface of the drop ball mount. One end of the drawbar is secured to the drop ball mount, and a second end of the drawbar is closed. Such closure preferably comprises an end cover secured to the second section of the drawbar by a drawbar end cover and enables cooperative engagement with the hitch alarm, as set forth below.

The shank assembly includes a shank, a ball mount, an upper ballast, a lower ballast, and a coupling member. The shank extends through the opening of the drop ball mount. The ball mount has a threaded engagement with one end of the shank.

Interchangeable ball mounts enable the same hitch assembly to be used to tow varying loads. The ball mounts are interchangeable and compatible with the same shank. In addition, the load-bearing capacity of the hitch assembly of the present invention can be varied by use of either the upper ballast and/or the lower ballast, the use of both ballasts and the larger ball mounts being used to tow the heaviest loads. And, the coupling member enables a secure engagement between the shank assembly and the drop ball mount, and preferably is a threaded fastener, such as a threaded nut.

The tow vehicle mount is secured to the undersurface of the towed vehicle. The tow vehicle mount comprises a receiver tube secured to a vehicle guide plate. The drawbar is inserted into and through the receiving tube. Additional strength between the receiver tube and guide plate is provided by a pair of receiver braces.

The preferred embodiment of the hitch alarm of the present invention involves the use of a plunger switch that detects an unauthorized removal of either the hitch member or the towed vehicle from the towing vehicle. The plunger switch is mounted through a retention surface positioned at the rear end of the receiving tube. The hitch alarm is substantially hidden from view when the drawbar is secured to the tow vehicle mount.

For a more complete understanding of the hitch locking mechanism of the present invention, reference is made to the following detailed description and accompanying drawings in which the presently preferred embodiments of the invention are shown by way of example. As the invention may be embodied in many forms without departing from spirit of essential characteristics thereof, it is expressly understood that the drawings are for purposes of illustration and description only, and are not intended as a definition of the limits of the invention. Throughout the description, like reference numbers refer to the same component throughout the several views.

BRIEF DESCRIPTION OF THE DRAWINGS

FIG. 10A discloses a trailer hitch coupler and FIG. 10B discloses a preferred embodiment of the plunger switch assembly for use in the trailer hitch coupler of FIG. 10A, the plunger switch assembly abutting the top of the ball mount, the plunger switch assembly being shown in the armed status (with the alarm status in phantom).

DETAILED DESCRIPTION OF THE PREFERRED EMBODIMENTS

Referring now to the drawings, FIG. 1, discloses an assembly view of the preferred embodiment of the hitch assembly of the present invention. The hitch assembly (100) comprises a hitch member (110), a shank assembly (140) for attachment to the towing vehicle, and a tow vehicle mount (160) for attachment to the towed vehicle.

The hitch member (110) comprises a drop ball mount (112), and a drawbar (114).

The drop ball mount (112) has two sections. The first section (116) is preferably substantially normal to the shank assembly (140) and includes an opening extending therethrough for the shank assembly (140). The second section (117) is inclined relative to the first section (116).

Figure 2A:
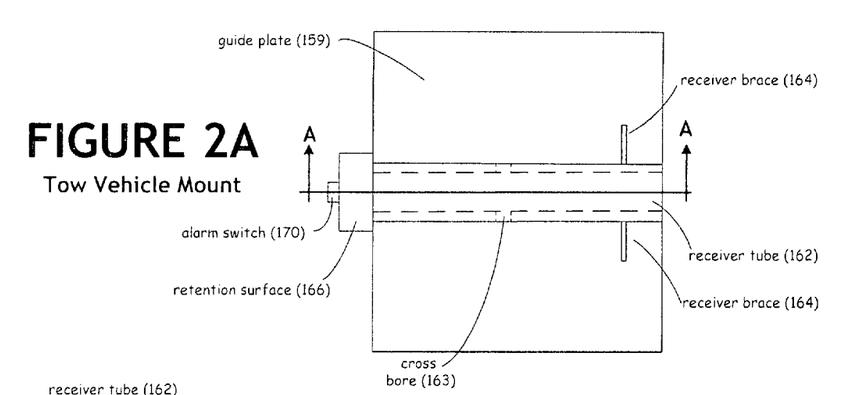
FIG. 2A discloses the preferred embodiment of the hitch locking mechanism of FIG. 1, the hitch locking mechanism having a hitch alarm disposed inside the receiver tube and hidden from view when the drawbar is secured to the receiving tube.
Figure 2B:
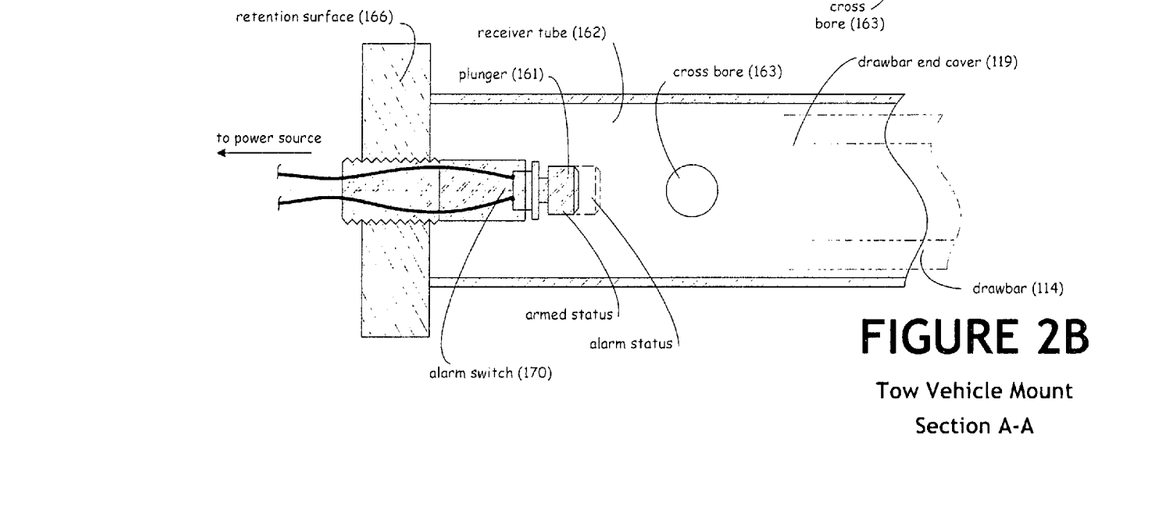
FIG. 2B discloses an exploded Section A-A from FIG. 2A of a plunger switch for use in receiver tube of the hitch locking mechanism of the present invention, the plunger switch abutting the drawbar endcover, the plunger switch being in the armed status, with the plunger switch in the alarm status in phantom.

The drawbar (114) is elongated, and secured to the undersurface of the second section (117). A first end of the drawbar is secured to the drop ball mount (112), and a second end of the drawbar (114) is closed. As shown in Detail C of FIG. 1, such closure preferably comprises an end cover (119) secured to the second section of the drawbar (114). Another configuration is a one-piece construction of the second section of the drawbar (114). The closure enables cooperative engagement with a hitch alarm (170), as shown in FIGS. 2A and 2B.

The preferred embodiment of the shank assembly (140) is shown in Detail A of FIG. 1. The shank assembly (140) includes a shank (40A), a ball mount (146), an upper ballast (148A), a lower ballast (148B), and a coupling member. The shank (40A), is best seen in Detail B1 of FIG. 1. The end of the shank opposite to the ball mount, includes a shank opening for engagement with a shank locking pin. The shank (40A) extends through the opening of the first section of the drop ball mount (112). The ball mount (46) preferably has a threaded engagement with one end of the shank (40A).

DETAIL B2 of FIG. 1 discloses another preferred embodiment of the shank assembly of the present invention. The shank (40B) includes a shoulder (55) that abuts an outer surface of ballast (148B) during engagement. Ballast (148B) rides on the end of the shoulder (55), the shoulder (55) having an external diameter slightly larger than the internal diameter of the ballast (148B). The shoulder (55) serves as a spacer, such that the shank assembly is free to rotate relative to the drop ball mount (112).

It is highly desirable to use the same hitch assembly for towing vehicles of differing sizes. Accordingly, the preferred embodiment of the shank assembly (140) of the present invention is designed and configured to tow varying loads under varying road and weather conditions. The shank assembly (140) is fully compatible with several ball mounts of differing sizes and construction, the larger ball mounts being employed for heavier loads and the smaller ball mounts being used for smaller loads. Thus, the ball mounts are interchangeable and compatible with the same shank (40A).

In addition, the load-bearing capacity of the hitch assembly of the present invention can be varied by use of either the upper ballast (148A) and/or the lower ballast (148B), the use of both ballasts and the larger ball mounts being employed to tow the heaviest loads. In a preferred embodiment of the hitch assembly (100) of the present invention, one ballast (148A) surrounds collar (145) of shank (144) abuts the upper surface of the drop ball mount (112) and the ball mount (146), and the second ballast abuts (148B) the undersurface of the drop ball mount (146) and the coupling member (150).

The coupling member (150) enables a secure engagement between the shank assembly (140) and the drop ball mount (112), and preferably is a threaded fastener, such as a threaded nut.

The tow vehicle mount (160) is secured to the undersurface of the towed vehicle. The tow vehicle mount (160) comprises a receiver tube (162) secured to a vehicle guide plate (159). The drawbar (114) is inserted into and through the receiving tube (162). A pair of receiver braces (159) provide additional strength between the receiver tube (162) and guide plate (159).

As best seen in FIGS. 2A and 2B, the preferred embodiment of the hitch alarm (160) of the present invention involves the use of a plunger switch, with plunger (161). The plunger switch is mounted through a retention surface (166), the retention surface (166) being secured onto the rear portion of the tow vehicle mount (160). The hitch alarm (160) detects an unauthorized removal of either the hitch member (110) or the towed vehicle from the towing vehicle. The hitch alarm (160) has an armed condition and an alarm condition. The hitch alarm (160) is substantially hidden from view when the drawbar (114) is secured to the tow vehicle mount (160). The hitch alarm (160) is in the armed condition when the towed vehicle is secured to the towing vehicle. A second embodiment of the hitch alarm (160), though not shown, involves the hitch switch (160) mounted through the drawbar end cover (119), and cooperatively engageable with the retention surface (166) of the tow vehicle mount The trigger for the alarm unit is initially armed upon installation of the hitch locking mechanism. Thereafter, the plunger switch (160) is placed in an alarm status.

Also, the principles of the plunger switch configuration of the present invention depicted can readily be adapted for other types of hitch designs. The plunger (162) is mounted so that the switch is armed once the hitch is secured to the towing vehicle. The switch (160) moves into an alarm condition whenever the hitch is removed from towing vehicle. The plunger switch (170) is secured to a backing plate. The plunger switch (170) is installed so that the axis of the plunger (161) is aligned with the axis of the drawbar movement within the receiver tube (162). Then, the plunger switch (170) is inched forward into the backing plate (166) until resistance is achieved—the resistance indicates the plunger (161) has met the drawbar end cover (119) and the plunger (161) is being pushed inward. Such plunger switches are commercially available from Sentrot Industrial a division of General Electric (i.e.—Model# 3010)

In another preferred embodiment of the hitch assembly (100) of the present invention, the drawbar (114) includes a cross bore (115), the cross bore (115) extending at least through one surface of said drawbar (114). The receiver tuber (162) includes a second cross bore (163). Upon insertion of the drawbar (114) into the receiver tube (162), the two cross bores become aligned in such a manner that a locking pin (118) can be inserted therethrough. The engagement of the locking pin (118) through the two cross bars (115 and 163) adds additional strength to the hitch assembly (100) of the present invention.

Figure 3A:
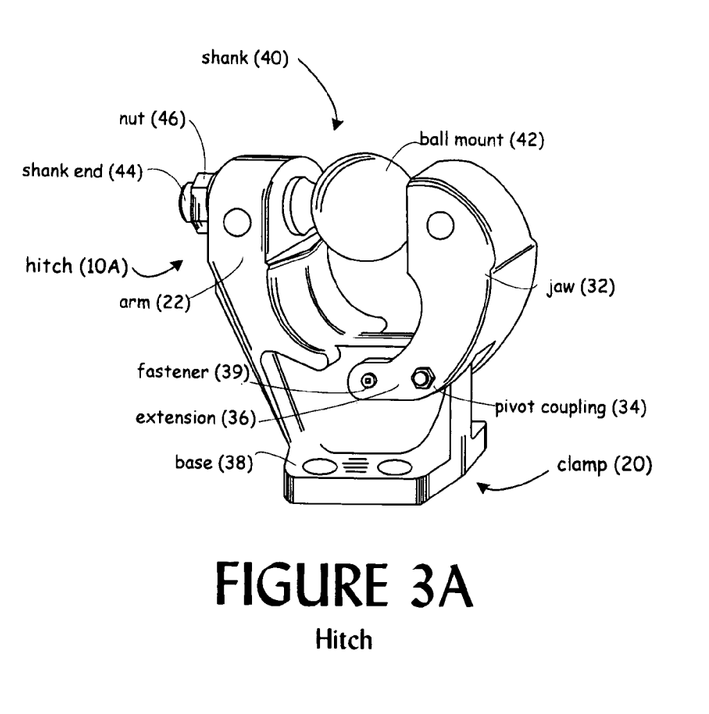
FIG. 3A discloses a first preferred embodiment of a hitch-locking mechanism of the present invention, the hitch locking mechanism being a modified Pintle-type clamp comprising a base, a jaw, and an arm, a shank assembly being secured to the arm.
Figure 3B:
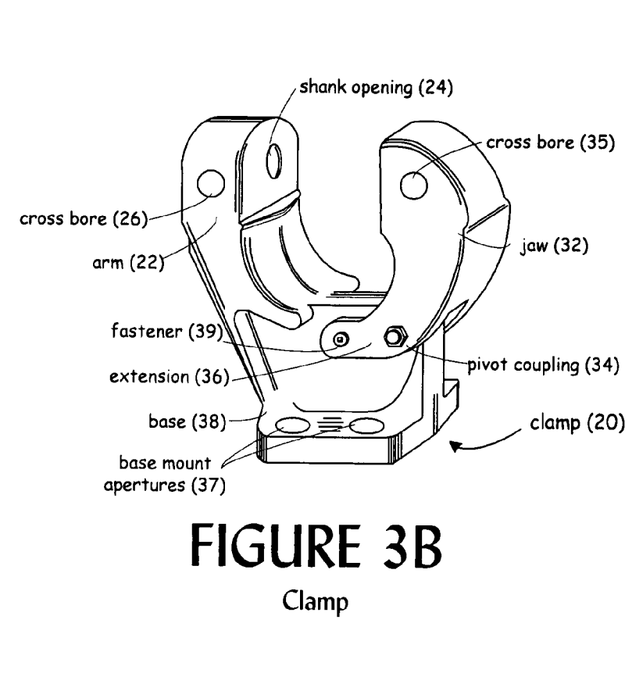
FIG. 3B discloses the preferred embodiment of the clamping member shown in FIG. 3A, the clamping member including a jaw being pivotally secured to the base member (without the shank assembly)

As depicted in FIGS. 3A and 3B, another preferred embodiment of a hitch-locking mechanism of the present invention is a Pintle-type clamp (20) comprising a base (38), a jaw (32), and an arm (22), a shank assembly (40) being secured to the arm (22). FIG. 3A discloses the hitch of the present invention comprising a clamping member and a shank assembly. FIG. 3B discloses the clamping member (20).

A hitch locking mechanism enables secure retention of a towing vehicle to a towed vehicle. The hitch-locking mechanism of FIG. 3A comprises a shank assembly (40A and a clamp (20). The clamp (20) is a modified Pentel-type clamp (20), and includes a base (38), an arm (22), and a jaw (32). The jaw (32) is pivotally attached to the base (38), and moves relative to the arm (22) between an upright position and an extended position. The base (38) includes six openings (39) for secure retention to a mounting plate securely retained to the towing vehicle.

The clamp (20) is a modified Pentel-type hitch. The modifications include a cross bore in the arm (22) of the clamp (20) that passes through an engaged shank (41). The cross bore enables a shaft to be inserted and engaged with the arm (22) and the shaft, providing additional secure engagement of the shank (41) to the clamp (20). The jaw (32) is pivotally secured to the clamp (20) through a pivotal coupling (34). The jaw (32) also includes a jaw extension (36) extending therefrom. A pair of jaw extension fasteners (39) extending and passing through opening (33) in the base (38) of the clamp (20) reinforce and provide additional strength for the hitch (10A).

Figure 4A:
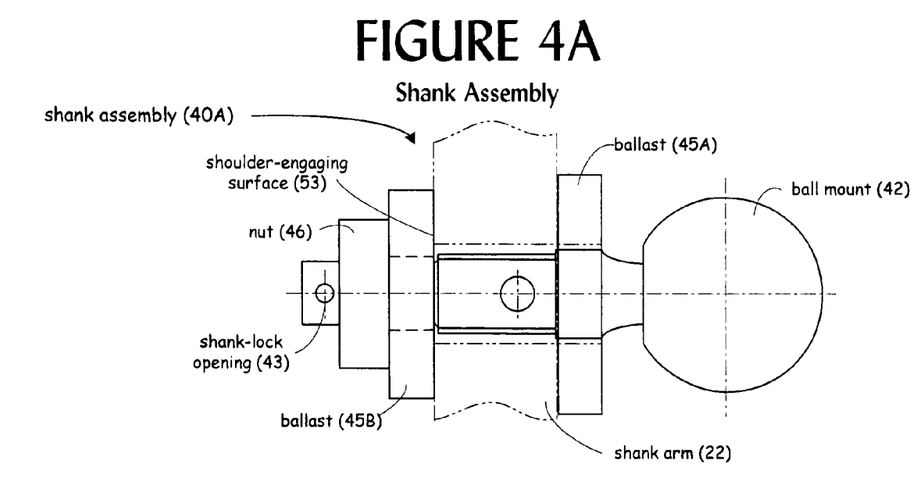
FIG. 4A discloses a preferred embodiment of the shank assembly of the present invention comprising a ball mount, a ballast, a nut, and a threaded shank, and FIG. 4B discloses another preferred embodiment of the shank assembly of the present invention comprising a ball mount, a ballast, a nut, and a threaded shank.
Figure 4B:
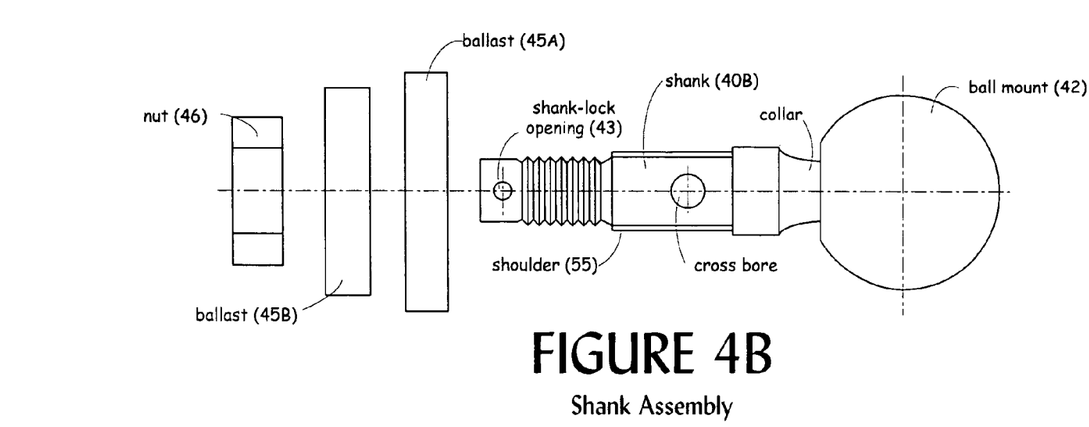

FIGS. 4A and 4B disclose another preferred embodiment of the shank assembly (40A) of the present invention comprising a ball mount (42), a ballast (45), a threaded nut (46), and a threaded shank (41). A first opening is positioned at the end of the shank and a second opening is positioned between the ball mount (42) and the threaded portion of the threaded shank (41). The portion of the threaded shank between the ball mount (42) and the threaded portion has a thickened shoulder (55) that abuts an outer surface (53) of ballast (45B) during engagement. Ballast (45B) rides on the end of the shoulder (55), the shoulder (55) having an external diameter slightly larger than the internal diameter of the ballast (45B)

White the shank assemblies shown in FIGS. 4A and 4B, FIGS. 5A and 5B, and FIGS. 6A and 6B are designed for the modified Pintle-type clamp (20) of FIG. 3B, such shank assemblies are also compatible with a conventional Pentel clamp. In addition, such shank assemblies are interchangeable and compatible with the hitch assembly (100) of FIG. 1.

Various ball mounts (42) can be secured to the shaft to accommodate smaller (about 1⅞" OD), medium (about 2" OD), or heavier loads (about 2 5/16" OD). The shank assembly (40A) is preferably affixed to the clamp (20) at more than one point for purposes of stability of the towing vehicle to the towed vehicle. The shank assembly comprises a shank (41), a ballast (45), and a threaded nut (46). The shank (41) has a ball mount (42) disposed at one end, a collar (47), a threaded body enabling cooperative engagement with the threaded nut (46), and a shank lock opening (43) enabling secure engagement with a lock (not shown). The nut securely retains the shank assembly (40A) to the arm (22) of the clamp (20).

Figure 5A:
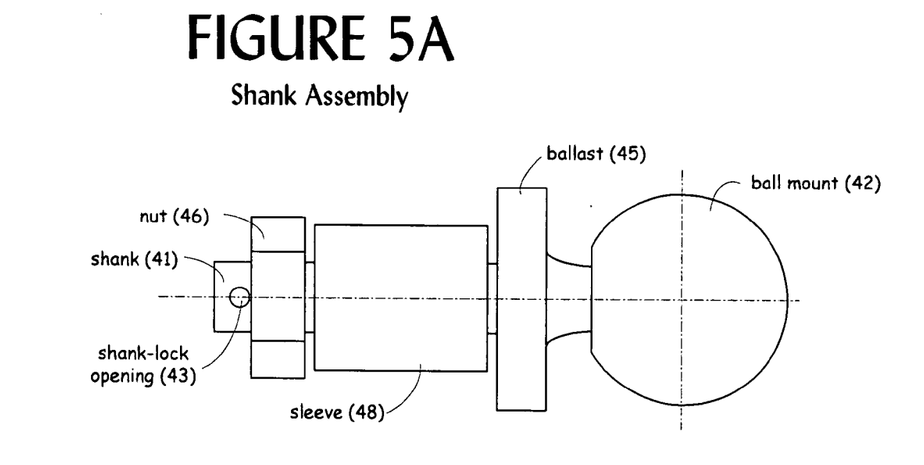
FIGS. 5A and 5B disclose an assembly view of a first preferred embodiment of the shank assembly of the present invention for use with a Pintle-type clamp, the shank assembly comprising a ball mount secured to a shank, a ballast member, a sleeve, and a retaining nut.
Figure 5B:
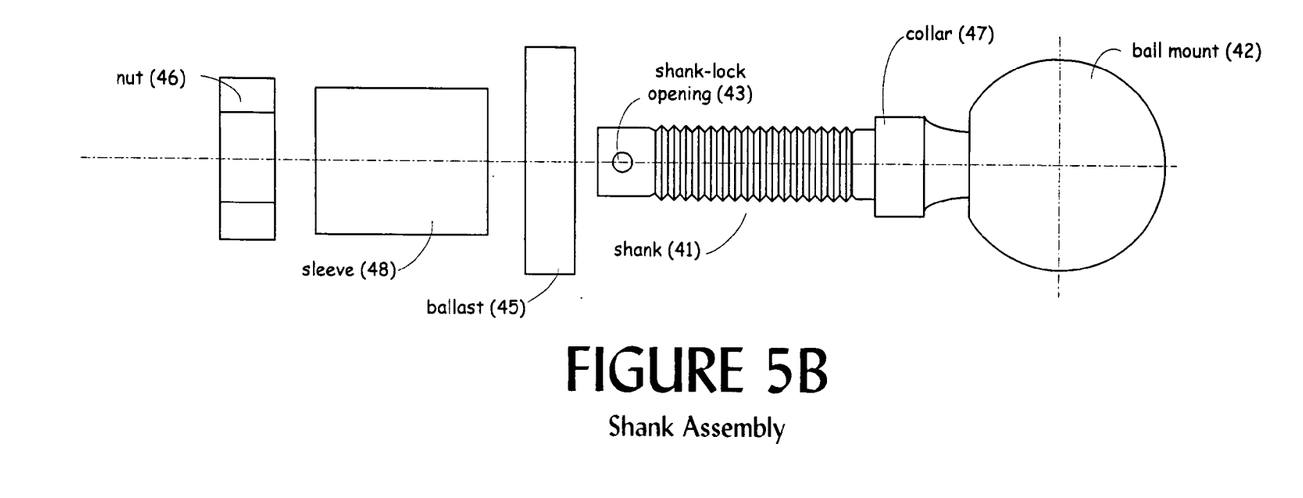

FIGS. 5A and 5B disclose an assembly view of another preferred embodiment of the shank assembly (40A) of the hitch locking mechanism (10A) of the present invention comprises a shank (41), a sleeve (48), a ballast (45), and a threaded retaining nut (46). The shank (41A) passes through a bore (24) disposed in the arm (22) of the clamp (20) along the longitudinal axis of the shank (41A). The arm (22) of the clamp (20) also includes a cross bore (26) enabling a shaft (not shown) to secure retention of the shank (41A) to the arm (22).

The hitch locking mechanism of the present invention secures a tow vehicle to a towing vehicle. The hitch locking mechanism (10A) comprises a shank (41E), a clamp (20), and a sleeve. The shank (41E) enables secure retention of a first shank end to a clamp (20), the shank (41E) being cooperatively engageable to a ball mount (42) for attachment to a second shank end, the towed vehicle being attachable to the ball mount (42). The clamp includes a base and a jaw (32), the jaw (32) having an upright position and an extended position relative to the base. The jaw (32) is pivotally attached to a base when the clamp (20) is in the upright position and in the extended position, the clamp (20) including a passageway for secure retention of the first shank end. The jaw (32) includes an opening for receiving a fastener, the fastener being engaged when the shank is securely retained to the base in the upright position and the extended position. A sleeve is positioned about the shank (41E) when the shank (41E) is retained to the clamp (20). The sleeve enables rotation of the ball mount (42) when the shank (41E) is secured within the clamp (20).

Figure 6A:
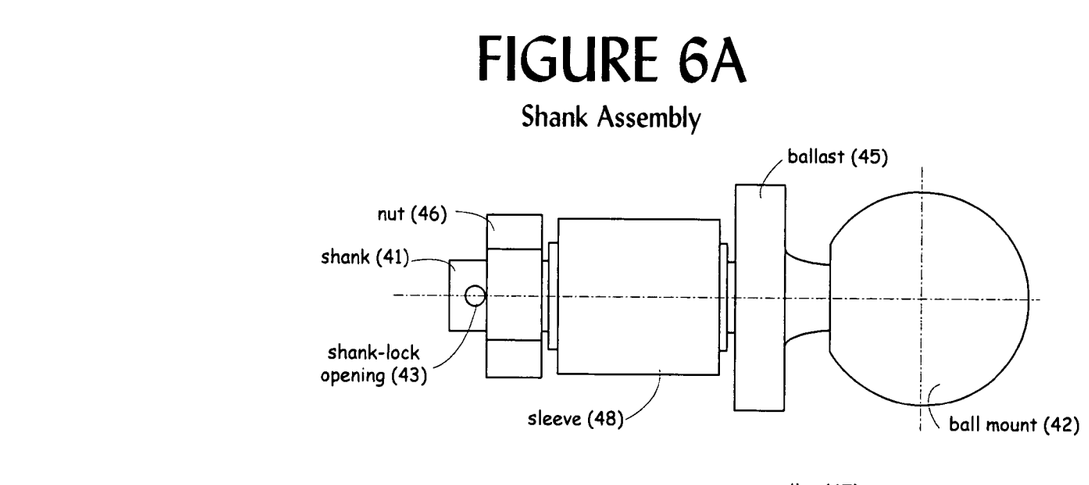
FIGS. 6A and 6B disclose an assembly view of a yet another preferred embodiment of the shank assembly of the present invention for use with a Pintle-type clamp, the shank assembly comprising a ball mount secured to a shank, a ballast member, an inner sleeve and an outer sleeve, and a retaining nut.
Figure 6B:
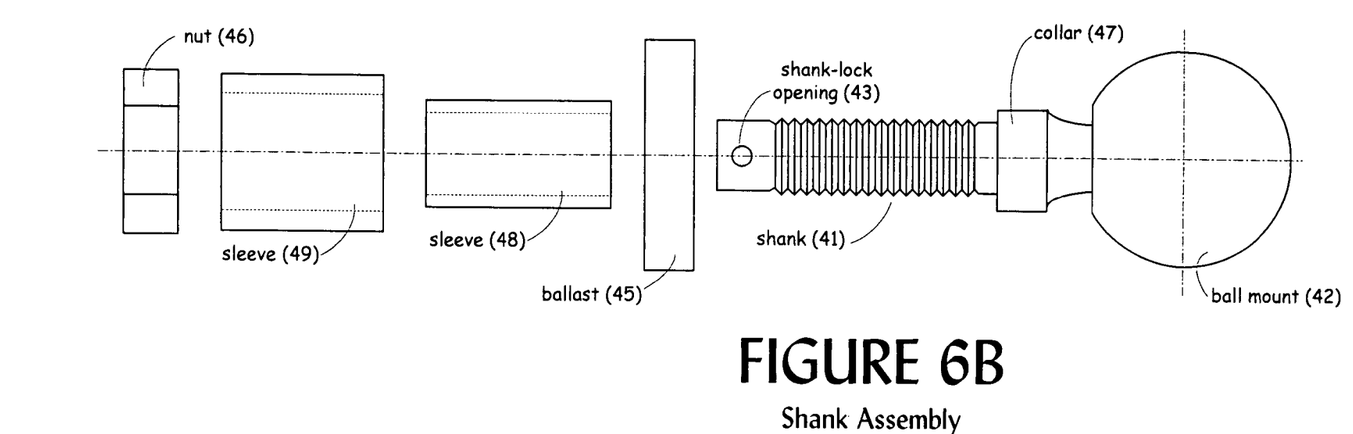

FIGS. 6A and 6B disclose an assembly view of yet another preferred embodiment of the shank assembly (40B) of the hitch locking mechanism (10A) of the present invention is shown. The shank assembly (40B) of comprises a shank (41B), an inner sleeve (48), an outer sleeve (49), a ballast (45), and a nut (46). The external diameter of the outer sleeve (49) fits in a snug manner into the shank opening (24). The external diameter of the inner sleeve (48) is slightly less than the internal diameter of the outer sleeve enabling a rotational movement of the inner sleeve relative to the outer sleeve. Again, this provides additional reinforcement foe the hitch mounting assembly (10A), while again improving wear properties of the ball mount (42). The outer sleeve has an internal diameter that is slightly larger than the external diameter of the shank (41B), enabling the free rotation of the sleeve relative to the shank (41B). This configuration improves wear of the ball mount (42), enabling the ball mount (42) to rotate within the clamp (20), without compromising secure retention of the hitch assembly relative to the towed vehicle. The sleeve combination enables rotation of the shank (41B) relative to the clamp (20) when the shank (41B) is secured within the clamp (20). The threaded nut (46) need only be hand tightened, so that the ball mount (42) can rotate within the sleeve providing more even wear of the ball mount (42).

Figure 7A:
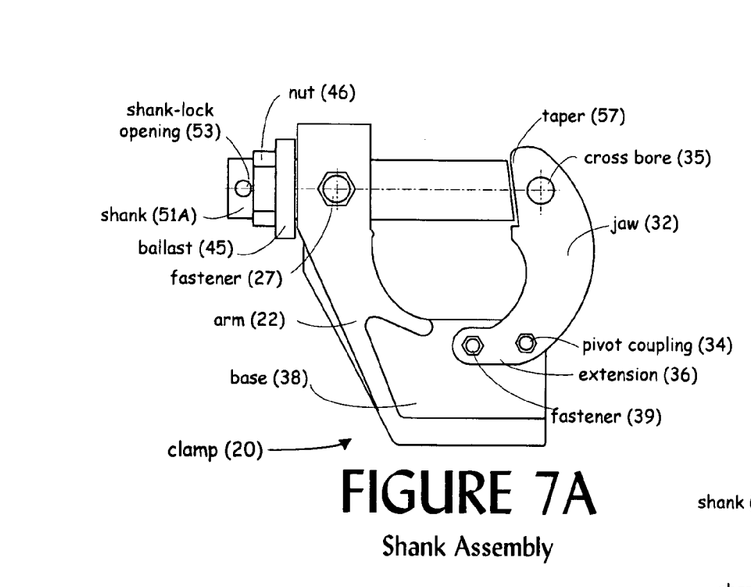
FIGS. 7A, 7B, and 7C disclose another embodiment of the hitch locking mechanism of the present invention, FIG. 7A depicting the shank assembly secured within the clamping member, FIGS. 7B and 7C depicting an assembly view of the shank assembly, the shank assembly comprising a shank with a taper at one shank end and a ballast member and a retaining nut at the opposing shank end.
Figure 7B:
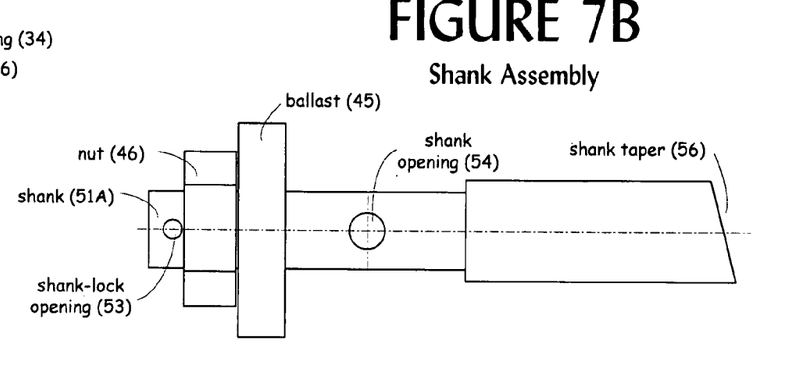
Figure 7C:
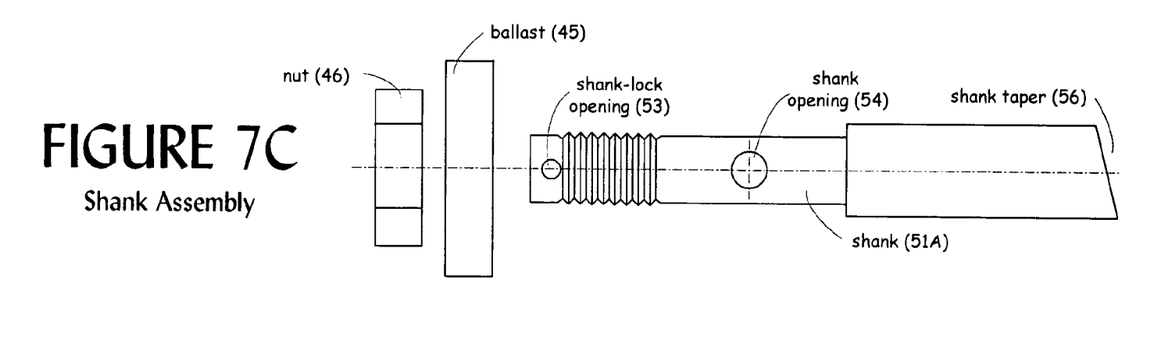

FIGS. 7A and 7B disclose an assembly view of yet another preferred embodiment of a shank assembly (40C) of the hitch locking mechanism of the present invention. The shank assembly (40C) comprises a shank (51), a ballast (45), and a threaded retaining nut (46). The towed vehicle is directly engaged to this shank (51). The shank (51) includes a shank taper (56) at one end that cooperatively engages with a jaw taper (57) having a similar grade to provide additional strength to the hitch locking mechanism of the present invention. The meshing engagement of the tapers (56 and 57) further secures the shank (51) to the clamp (20).

Figure 8A:
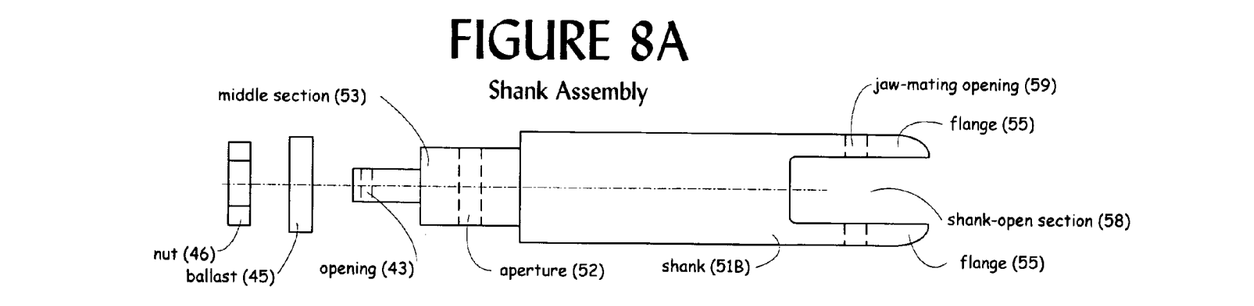
FIG. 8A discloses a top view and FIG. 8B discloses a side view of still another preferred embodiment of trailer hitch mount of the present invention (see FIG. 8C), the shank including an arm-shank mating opening and a jaw-shank mating opening.
Figures 8B, 8C:
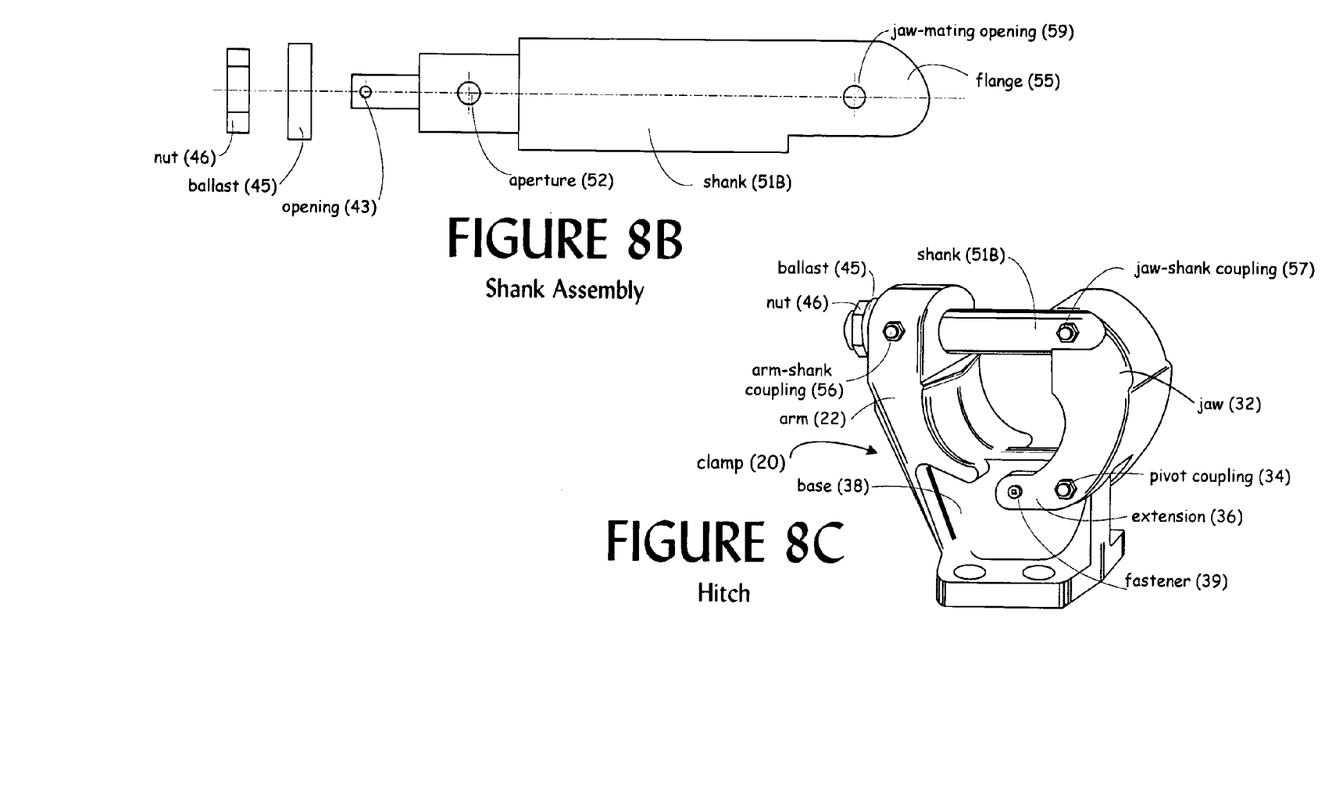

FIGS. 8A and 8B disclose an assembly view of still yet another preferred embodiment of a shank assembly (40C) of the hitch locking mechanism of the present invention. The shank assembly (40C) is useful for towing extra-heavy loads (as much as 10 to 20 tons) because of the multiple engagements between the shank (51C) and the clamp (20)—including the cross bore fasteners (56 and 57) through the arm (22) and the jaw (32), respectively, and a matching taper between the shank (51C) and the jaw (32) not shown. The shank assembly (40C) comprises a shank (51C), a ballast (45), and a threaded retaining nut (46). The towed vehicle is directly engaged to this shank (51C).

FIGS. 8A, 8B, and 8C disclose still another embodiment of the hitch locking mechanism of the present invention. FIGS. 8A and 8B depicts a top view and a side view of the shank (51D), respectively, of the shank (51D) for use in the hitch locking mechanism as depicted in FIG. 8C. An opening (43) is disposed at one end of the shank (51D) for engagement with a lock, an arm-mating opening (52) is disposed in the middle section (53) of the shank and a jaw-mating opening (59) is disposed at the other end of the shank (51D).

Figure 9A:
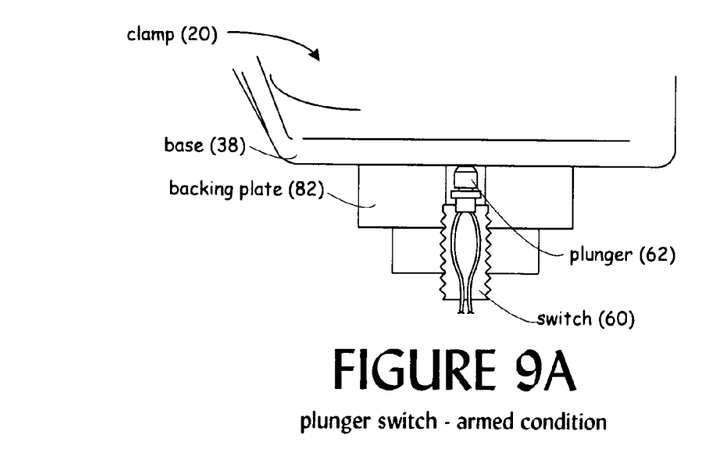
FIG. 9A discloses a preferred embodiment of a plunger switch assembly for use in the hitch locking mechanism of the present invention, the plunger switch assembly abutting the undersurface of a Pintle-type clamp, the plunger switch assembly being in the armed condition, and FIG. 9B discloses the plunger switch of FIG. 9A in the alarm condition.
Figure 9B:
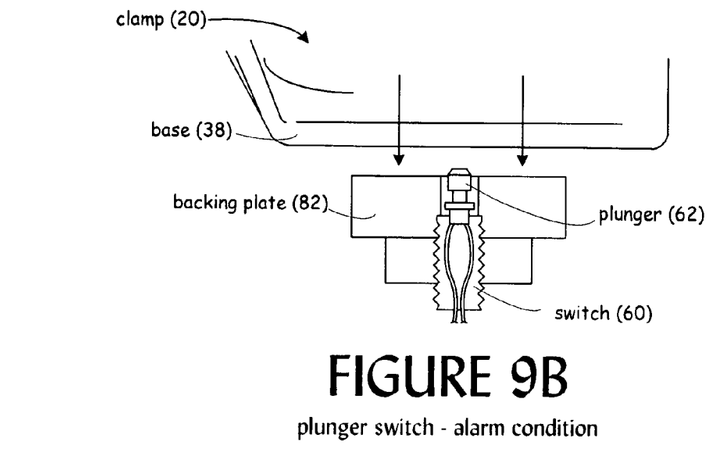

FIG. 9A discloses a preferred embodiment of a plunger switch assembly for use in the hitch locking mechanism of the present invention, the plunger switch assembly abutting the undersurface of a Pintle-type clamp, the plunger switch assembly being in the armed condition, and FIG. 9B discloses the plunger switch of FIG. 9A in the alarm condition. The alarm configuration shown in FIGS. 9A and 9B is compatible with a modified Pintle-type clamp of FIG. 3B or with a conventional Pintel clamp. The hitch mounting is secured to a towing vehicle. The hitch mounting has a recess. The plunger switch (60) is disposed within the recess. A plunger switch (60) is a small button-like device that is spring loaded. The plunger switch (60) has an armed condition and an alarm condition (see FIG. 2B).

Figures 10A, 10B:
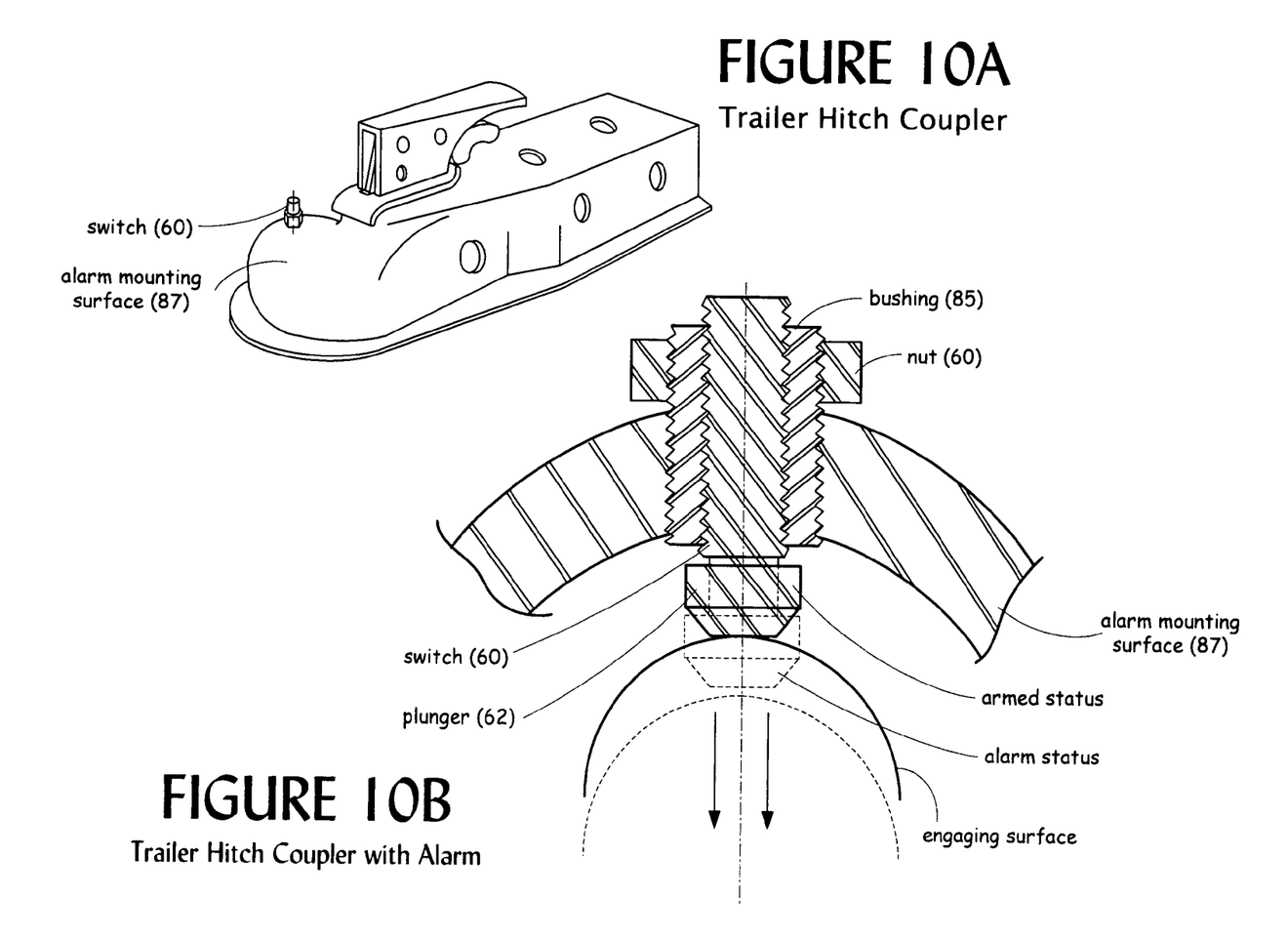

FIG. 10A discloses a trailer hitch coupler. FIG. 10B discloses a preferred embodiment of the plunger switch assembly of the present invention for use in the trailer hitch coupler of FIG. 10A. The alarm switch (60) is secured with a bushing (85), the bashing being internally threaded to engagement with the alarm switch extending therethrough. The bushing (85) also preferably has external threads for secure retention within the trailer hitch coupler. The alarm switch (60), when in the armed status is engaged against an engaging surface. When the engaging surface is withdrawn, the alarm switch (60) moves into an alarm status (shown in phantom). A cover positioned over the trailer hitch cover (not shown) conceals the alarm switch.

Throughout this application, various patents and publications are referenced by number. The disclosures of these documents in their entireties are hereby incorporated by reference into this specification in order to more fully describe the state of the art to which this invention pertains.

It is evident that many modifications, and variations of the hitch locking mechanism of the present invention will be apparent to those skilled in the art in light of the disclosure herein. It is intended that the metes and bounds of the present invention be determined by the appended claims rather than by the language of the above specification, and that all such alternatives, modifications, and variations which form a conjointly cooperative equivalent are intended to be included within the spirit and scope of these claims.

I claim:

1. A hitch assembly for securing a towing vehicle to a towed vehicle, the hitch assembly comprising:
   a. A hitch member for attachment to the towing vehicle, said hitch member comprising a drop ball mount, said drop ball mount having a first section and a second section, said second section being inclined relative to said first section, said first section having an opening extending therethrough; and said hitch member including a drawbar, said drawbar being elongated, a first end of said drawbar being secured to a drop ball mount, a second end of said drawbar having a closed surface, said closed surface enabling cooperative engagement with a hitch alarm, said drawbar being secured to an undersurface of the second section;
   b. a shank assembly including a shank, a first ball mount, a ballast, and a coupling, said shank extending through said opening of said first section of said drop ball mount, said first ball mount threadingly engageable to and disposed at a first end of the shank, said ball mount being interchangeable with a second ball mount, said first ball mount accommodating first load conditions, said second ball mount accommodating load conditions different from said first load conditions, said first and second ball mounts being attachable to said towing vehicle, said ballast abutting either an upper surface or an undersurface of said first section of said drop ball mount, said coupling for attachment to said second end of said shank assembly, said coupling enabling a secure engagement between said shank assembly and said drop ball mount;

c. a tow vehicle mount for secure retention to said towed vehicle, said tow vehicle mount comprising a receiver tube secured to a vehicle mount, said receiving tube for cooperative engagement with said drawbar extending therewithin, said tow vehicle mount including a retention surface; and d. a hitch alarm mounted with said retention surface, said hitch alarm for detecting an unauthorized removal of either the hitch member or the towed vehicle from the towing vehicle, said hitch alarm having an armed condition and an alarm condition, said hitch alarm being substantially hidden from view when said drawbar is secured to said vehicle mount.

2. The hitch assembly of claim 1, wherein said hitch alarm is in the armed condition when the towed vehicle is secured to the towing vehicle.

3. The hitch assembly of claim 1, wherein the hitch alarm is a plunger switch having a plunger, said plunger of the plunger switch abutting the closed surface of the drawbar when the alarm switch is in the armed condition.

4. The hitch assembly of claim 1, wherein the hitch alarm is mounted into the retention surface of said tow vehicle mount.

5. The hitch assembly of claim 1, wherein the drawbar end cover is a surface secured to the second end of the drawbar.

* * * * *